United States Patent
Perry et al.

(10) Patent No.: US 9,836,503 B2
(45) Date of Patent: Dec. 5, 2017

(54) INTEGRATING LINKED DATA WITH RELATIONAL DATA

(71) Applicant: Oracle International Corporation, Redwood Shores, CA (US)

(72) Inventors: Matthew Steven Perry, Brookline, NH (US); Ana Paula Estrada Vargas, Zapopan (MX)

(73) Assignee: Oracle International Corporation, Redwood Shores, CA (US)

(*) Notice: Subject to any disclaimer, the term of this patent is extended or adjusted under 35 U.S.C. 154(b) by 125 days.

(21) Appl. No.: 14/159,702

(22) Filed: Jan. 21, 2014

(65) Prior Publication Data
US 2015/0205880 A1    Jul. 23, 2015

(51) Int. Cl.
G06F 17/30    (2006.01)

(52) U.S. Cl.
CPC ............... *G06F 17/30445* (2013.01)

(58) Field of Classification Search
CPC ......... G06F 17/30421; G06F 17/30442; G06F 17/30448; G06F 17/30451; G06F 17/30454; G06F 17/30457; G06F 17/3046; G06F 17/30466; G06F 17/30471; G06F 17/30103; G06F 17/30498; G06F 17/30929; G06F 17/30932; G06F 17/30935; G06F 17/30938; G06F 17/30941; G06F 17/30657; G06F 17/30637; G06F 17/30646; G06F 17/30474; G06F 17/30445; G06F 17/30463
USPC ............... 707/713, 714, 716, 717, 718, 759
See application file for complete search history.

(56) References Cited

U.S. PATENT DOCUMENTS

| | | | |
|---|---|---|---|
| 7,328,209 B2 | 2/2008 | Das et al. | |
| 7,680,862 B2 * | 3/2010 | Chong | G06F 17/30448 707/718 |
| 7,818,352 B2 | 10/2010 | Krishnamoorthy et al. | |
| 7,979,455 B2 | 7/2011 | Krishnamoorthy et al. | |
| 8,037,008 B2 | 10/2011 | Jung et al. | |
| 8,140,556 B2 | 3/2012 | Rao et al. | |
| 8,204,856 B2 | 6/2012 | Meyer et al. | |
| 8,285,748 B2 | 10/2012 | Thomas et al. | |
| 8,484,233 B2 | 7/2013 | Xie et al. | |

(Continued)

OTHER PUBLICATIONS

Reinwald et al., Heterogeneous Query Processing Through SQL Table Functions, Data Engineering, 1999. Proceedings., 15th International Conference on Year: 1999, pp. 366-373.*

(Continued)

*Primary Examiner* — Greta Robinson
(74) *Attorney, Agent, or Firm* — Vista IP Law Group, LLP (57) ABSTRACT

A method, system, and computer program product for accessing a SPARQL endpoint that is specified from within a SQL database query language statement. A method embodiment receives a SQL database query language statement that is then parsed in order to identify the locations of one or more SPARQL endpoints to be accessed. The database query language statement comprises operations and/or queries (e.g., SPARQL queries) to be performed over at least some linked data (e.g., queries over named RDF graphs) found at the one or more SPARQL endpoints. The database query language statement can also specify relational operations such as a relational database table operation, and/or a view operation, and/or other relational database functions that operate in conjunction with retrieved linked data.

20 Claims, 9 Drawing Sheets

(56) References Cited

U.S. PATENT DOCUMENTS

| | | | |
|---|---|---|---|
| 8,719,252 B2* | 5/2014 | Miranker | G06F 17/30569 707/713 |
| 8,949,225 B2 | 2/2015 | Wu et al. | |
| 8,972,405 B1 | 3/2015 | Chaulk | |
| 2004/0236767 A1 | 11/2004 | Soylemez et al. | |
| 2006/0235823 A1 | 10/2006 | Chong | |
| 2007/0038609 A1 | 2/2007 | Wu | |
| 2007/0038658 A1* | 2/2007 | Ghosh | G06F 17/30471 |
| 2007/0276197 A1 | 11/2007 | Harmon | |
| 2008/0104032 A1 | 5/2008 | Sarkar | |
| 2008/0126397 A1 | 5/2008 | Alexander | |
| 2009/0012842 A1 | 1/2009 | Srinivasan et al. | |
| 2009/0106234 A1 | 4/2009 | Siedlecki et al. | |
| 2009/0138437 A1 | 5/2009 | Krishnamoorthy et al. | |
| 2009/0138498 A1* | 5/2009 | Krishnamoorthy | G06F 17/30427 |
| 2010/0049763 A1 | 2/2010 | Jung et al. | |
| 2010/0124216 A1 | 5/2010 | Ku | |
| 2010/0165947 A1 | 7/2010 | Taniuchi et al. | |
| 2010/0185643 A1 | 7/2010 | Rao et al. | |
| 2010/0241644 A1 | 9/2010 | Jackson et al. | |
| 2010/0281053 A1 | 11/2010 | Braines et al. | |
| 2011/0040717 A1 | 2/2011 | Rho et al. | |
| 2011/0047178 A1 | 2/2011 | Song | |
| 2011/0113072 A1 | 5/2011 | Lee et al. | |
| 2012/0102022 A1* | 4/2012 | Miranker | G06F 17/30427 707/713 |
| 2012/0102472 A1 | 4/2012 | Wu et al. | |
| 2012/0166446 A1 | 6/2012 | Bowman et al. | |
| 2012/0179644 A1 | 7/2012 | Miranker | |
| 2012/0271860 A1 | 10/2012 | Graham et al. | |
| 2012/0303668 A1 | 11/2012 | Srinivasan et al. | |
| 2013/0262443 A1* | 10/2013 | Leida | G06F 17/30427 707/722 |
| 2013/0318070 A1 | 11/2013 | Wu et al. | |
| 2013/0329723 A1 | 12/2013 | Ku | |
| 2013/0332473 A1* | 12/2013 | Ryman | G06F 17/30569 707/754 |
| 2014/0025694 A1 | 1/2014 | Ryman | |
| 2014/0156643 A1 | 6/2014 | Rais-Ghasem | |
| 2014/0201234 A1* | 7/2014 | Lee | G06F 17/30964 707/769 |
| 2014/0214857 A1 | 7/2014 | Srinivasan et al. | |
| 2014/0304251 A1* | 10/2014 | Bornea | G06F 17/30463 707/718 |
| 2015/0310129 A1* | 10/2015 | Ushijima | G06F 17/30958 707/798 |

OTHER PUBLICATIONS

Droop et al.. "Translating XPath Queries into SPARQL Queries", OTM 2007 Workshops, Part I, LNCS 4805, pp. 9-10, 2007 Springer-Verlag Berlin Heidelberg, 2007.

Gregory A. Silver, Osama Al-Haj Hassan and John A. Miller, University of Georgia, "From Domain Ontologies to Modeling ontologies to Exwcutable Simulation Models", Proceedings of the 2007 Winter Simulation Conference, Dec. 9-12, 2007, (pp. 1108-1117).

Jong-Hoon Lee; Jung-Tae Kim; Hoon-Ki Lee; Eui-Hyun Paik, "Design and implementation of the Geo-Context Engine for semantic social media service", Published in: Internet Technology and Secured Transactions (ICITST), 2011 International Conference for Date of Conference: Dec. 11-14, 2011, pp. 383-387.

L. Ding et al. "TWC LOGD: A Portal for Linked Open Government Data Ecosystems", The Jounal of Web Semenatics, vol. 9, Issue 3, Sep. 2011, pp. 325-333.

"Semantic Web Activity", 2011, W3C, 5 pages, url: http://www.w3.prg/2001/sw/.

"RDF/XML Syntax Specification (Revised)", W3C Recommendation, W3C, Feb. 10, 2004, 33 pages, url: http://www.w3.org/TR/REC-rdf-syntax/.

"RDF Primer", W3C Recommendation, W3C, Feb. 10, 2004, 55 pages, url: http://www.w3.org/TR/rdf-primer/.

"SPARQL Query Language for RDF", W3C Recommendation, W3C, Jan. 15, 2008, 90 pages, url: http://www.w3.org/TR/rdf-sparql-query/.

"Apache Jena", The Apache Software Foundation, Version 2.0, Dec. 2011, 2 pages, url: http://jena.sourceforge.net/.

"openRDF.org", home of Sesame, Aduna, 1997-2012, 1 page, url: http://www.openrdf.org/.

"SPARQL Protocol for RDF", W3C Recommendation, W3C, Jan. 15, 2008, 19 pages, url: http://www.w3.org/TR/rdf-sparql-protocol/.

"RDF Semantics", W3C Recommendation, W3C, Feb. 10, 2004, 55 pages, url: http://www.w3.org/TR/rdf-mt/.

"Software Downloads", Oracle, May 14, 2011, 3 pages, url: http://www.oracle.com/technology/software/tech/semantic.sub.--technologie-s/index.html.

"Linked Data, Connect Distributed Data across the Web", May 1, 2011, 1 page, url: http://linkeddata.org/.

"Oracle Business Intelligence Enterprise Edition Plus", Oracle, Aug. 3, 2010, 2 pages, url: http://www.oracle.com/technetwork/middieware/bi-enterprise-edition/overvi-ew/index.html.

"Oracle Database 11g Release 2 Semantic Technologies Using the Jena Adaptor for Oracle Databse", Sep. 2009, 24 pages, url: http://download.oracle.com/otndocs/tech/semantic.sub.--web/pdf/semtech11q-r2.sub.--jenaadapt-tl.pdf.

Sparqlify Wiki, "Comparison with R2RML" Oct. 30, 2012, 3 pages url: http://sparqlify.org/wiki/Comparison_with_R2RML.

"1 Oracle Database Semantic Technologies Overview" Oracle Database Semantic Technologies Developer's Guide, 11g Release 2 (11.2), Part No. E25609-03, May 25, 2012, 38 pages.

"Oracle Semantic Technologies Developer's Guide" Oracle Database, 11g Release (11.1), B28397-05, Jul. 2009, 112 pages.

"SPARQL 1.1 Query Language" W3C, W3C Recommendation Mar. 21, 2013, 89 pages.

Microsoft, "Expression (Database Engine)", SQL Server 2008 R2, 2008, 2 pages.

Technology and Society domain, "Named Graphs", Semantic Web Interest Group, Jan. 17, 2008, 5 pages.

W3C, "SPARQL Query Language for RDF", Jan. 15, 2008, 2 pages.

Non-final Office Action dated Jul. 31, 2014 for related U.S. Appl. No. 13/753,329.

Non-final Office Action dated Mar. 3, 2015 for related U.S. Appl. No. 13/753,329.

Gibson et al., "Application of Named Graphs Towards Custom Provenance Views," Feb. 23, 2009, Pacific Northwest National Laboratory, 1st Workshop on the Theory and Practice of Provenance, http://wiki.esi.ac.uk/w/files/4/49/Gibson.pdf.

Oracle OLAP Application Developer's Guide, Oracle OLAP, Dec. 2003, Oracle Corporation, Part No. B10333-02, Pertinent pp. 1, 37, 49, 132, 146, 360; http://web/stanford.edu/dept/itss/docs/oracle/10g/olap.101/b10333.pdf.

Cyganiak, "A Relational Algebra for SPARQL," Sep. 28, 2005, Hewlett-Packard Development Company, L.P., HP-2005-170, http://www.hpl.hp.com/techreports/2005/HPL-2005-170.pdf.

Final Office Action dated Sep. 25, 2015 for related U.S. Appl. No. 13/753,329.

Non-final Office Action dated May 19, 2016 for related U.S. Appl. No. 13/753,329.

SSWS (The 7th International Workshop on Scalable Semantic Web Knowledge Base Systems, Oct. 24, 2011, 10th International Semantic Web Conference). Http://iswc2011.sematicweb.org/fileadmin/iswc/Papers/Workshops/SSWS/SSWS2011-Proceedings.pdf.

Final Office Action dated Nov. 28, 2016 for related U.S. Appl. No. 13/753,329.

Notice of Allowance and Fee(s) due dated Feb. 23, 2017 for related U.S. Appl. No. 13/753,329.

Ramanujam et al., "Bi-directional Translation of Relational Data into Virtual RDF Stores" Dec. 1, 2010, IEEE 4th International Conference on Semantic Computing, ICSC, pp. 1-9.

* cited by examiner

INTEGRATING LINKED DATA WITH RELATIONAL DATA

RELATED APPLICATIONS

Certain aspects in some embodiments of the present application are related to material disclosed in U.S. Pat. No. 7,328,209, entitled "SYSTEM FOR ONTOLOGY-BASED SEMANTIC MATCHING IN A RELATIONAL DATABASE SYSTEM" filed on Aug. 11, 2004, the content of which is hereby incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosure relates to the field of database systems and more particularly to techniques for accessing a SPARQL endpoint from within an SQL query.

BACKGROUND

The inexorable advance of all dimensions of the internet has fostered the appearance of semantic data. Semantic data often takes the form of RDF data (Resource Description Framework data) that comports with standardized data storage models (e.g., W3C standard-based data storage models) that include representation of information in such a way as to enable computer-aided interpretation of the meaning or meanings (e.g., semantics) from the data without the need to know the specifics of its schema or meta-model. Such semantic data representations are often fact oriented. Facts are typically expressed by binary relations between data elements, and binary relations often take the form of triples that specify two objects and a relation between the two objects. Strictly as an illustrative example, a triple can be of the construction:

Object1<RelationType>Object2 which construction carries a relationship between two things such as the relationship where the "Eiffel Tower" (Object1) "<is located in>" "Paris" (Object2).

Often large amounts of semantic data such as RDF data are stored at and/or made accessible at remote computing nodes. In some cases RDF data is stored remote computing nodes in disparate geographies, and accessible over the internet using a URL or URI. Often, the term "linked data" refers to a method of publishing RDF data or other structured data so that it can be interlinked and readily accessed on the web. Linked data is sometimes built on a suite of World Wide Web Consortium (W3C) technologies.

Unfortunately, access to such RDF data is hampered by legacy techniques in that legacy access requires the RDF data to be pre-accessed and/or pre-staged by middleware before the RDF data can be accessed by the database engine (e.g., to be combined with local relational data). It would be convenient to have a native database query (e.g., in a native database language such as SQL) such that access to a remote RDF repository can be made via an HTTP URL address such as "<http://domainname.com/RDFDATA>" that can be made natively in a single query, the results of which query are combinable with local relational data—all without having to pre-access and/or pre-stage RDF data.

RDF data is often stored at remote endpoints termed SPARQL endpoints (aka SPARQL Protocol and RDF Query Language endpoints). SPARQL endpoints are network-accessible locations (e.g., computing nodes) that are addressable (e.g., by a network address such as a URL), at which location a SPARQL query can be performed (e.g., over RDF data). In many situations, public or parapublic organizations or institutions assemble RDF data, and post for internet access. For example, "dbpedia.org" represents a global community effort to extract structured information from periodic Wikipedia dumps, and to make this information available on the web. It is served to the public via a live instance of a SPARQL endpoint at "http://dbpedia.org/".

Some SPARQL endpoints have the characteristic that they can receive and process SPARQL queries and/or other service requests. Such SPARQL endpoints comprise a computer node accessible over the internet, such that a SPARQL endpoint can be accessed and directed (e.g., by a caller from another computer) to process a SPARQL query, and return results to the caller. The SPARQL results can then be further processed, including combining the SPARQL results with other data and/or generating reports, etc.

In certain legacy systems, after executing a SPARQL query at a SPARQL endpoint, the SPARQL results are stored (e.g., as locally-stored RDF data) for later access, which later access might include performing local queries over the corpus of locally-stored RDF data. Such local queries return results (e.g., as a table of values). This access technique (e.g., using a table function) can include combining locally-stored RDF data with locally-stored relational data so as to provide access to SPARQL query results in the same context as access to relational data. For example, relational tables can be joined with SPARQL query results, and tables and views can be created from SPARQL query results.

However, the legacy access techniques are only able to query locally-stored RDF data. This limitation is exacerbated when the size of the RDF data becomes large, thus incurring large resource requirements to move the RDF data from a SPARQL endpoint to a corpus of locally-stored RDF data. What is needed is a technique or techniques for specifying a single query in one database system context (e.g., an SQL query within a database system) wherein the single query specifies access to non-local RDF data that is brought into the aforementioned database system context.

SUMMARY

The present disclosure provides an improved method, system, and computer program product suited to address the aforementioned issues with legacy approaches. More specifically, the present disclosure provides a detailed description of techniques used in methods, systems, and computer program products for accessing a SPARQL endpoint from within an SQL query.

One embodiment receives a SQL database query language statement that is parsed in order to identify one or more SPARQL endpoints to be accessed. The database query language statement comprises operations and/or queries (e.g., SPARQL queries) to be performed over at least some linked data (e.g., queries over named RDF graphs) accessed from the one or more SPARQL endpoints.

In addition to specifications of operations to be performed over at least some linked data found at the one or more SPARQL endpoints, the database query language statement can also specify relational operations such as a relational database operation, a view operation, and/or other relational database functions that operate in conjunction with received linked data.

Further details of aspects, objectives, and advantages of the disclosure are described below and in the detailed description, drawings, and claims. Both the foregoing general description of the background and the following detailed description are exemplary and explanatory, and are not intended to be limiting as to the scope of the claims.

DETAILED DESCRIPTION

Disclosed herein and in the accompanying figures are exemplary environments, methods, and systems for accessing a SPARQL endpoint from within an SQL query.
Overview Disclosed herein are techniques to form a query (e.g., a SQL query) that comprises a location of an RDF data repository (e.g., a remote computer) so as to retrieve RDF data and bring it into a local database context so as to integrate local relational data and/or local RDF data with the data received from the RDF data repository. One such technique includes specifying a single query in one database system context (e.g., an SQL query within a database system) wherein the single query specifies access to a SPARQL endpoint, which SPARQL endpoint is then accessed and the results brought into the aforementioned database system context. Another technique includes specifying a single query in a first database system context (e.g., an SQL query within a database system) wherein the single query embeds a query to be processed by a remote endpoint over RDF data (e.g., in a second database context), the results of which embedded query is processed into relational data and brought into the first database system context as relational database rows, which in turn can be combined with other relational data in the first database context.

In some discussions herein, the term "linked data" refers to a method of publishing structured data so that it can be interlinked and become more useful. Linked data is rapidly growing in popularity as a paradigm for data integration both within the enterprise and on the web. Linked data is sometimes built on a suite of World Wide Web Consortium (W3C) technologies, namely HTTP, URIs, RDF, OWL and SPARQL (see http://www.w3.org/2001/sw/Specs).

The linked open data cloud repository now contains hundreds of interlinked datasets with billions of RDF triples (see http://linkeddata.org/). The acronym SPARQL is an acronym put forth by the W3C referring to the protocol and query language for querying RDF data.

Some approaches to implement the database query language SQL may support a construction referred to as the "SEM_MATCH table function". Although the SEM_MATCH construction can execute SPARQL queries against locally-stored RDF data and return the results as a table of values, the SEM_MATCH construction provides no facility to specify a SPARQL endpoint. Using SEM_MATCH constructions, a table function allows relational data to be integrated with locally-stored RDF data. For example, using SEM_MATCH constructions local relational tables could be joined with prepositioned SPARQL query results, and tables and views can be created from SPARQL query results. However, the syntax and semantics of SEM_MATCH are limited to accessing local prepositioned RDF data. The syntax and semantics of SEM_MATCH fail to specify and/or access remote SPARQL endpoints (public or private) that serve RDF linked data.

The syntax and semantics of the herein-disclosed SPARQL_SERVICE construction provides the syntax and semantics to access a specified remote SPARQL endpoint and integrate the returned data with relational data. The syntax for such access is provided using new constructions to extend a database query language. In some embodiments, the syntax for providing access to remote RDF data is provided using new constructions in the form of a TABLE function in SQL, which TABLE function is merely one way to generate a relational data row source. In a TABLE implementation, the syntax includes a way for a requestor to identify (e.g., via a network address) the location of a remote repository where RDF data is stored, and where such RDF data can be queried, and from which remote location the results of the RDF query are packaged for returning to the requestor. After the TABLE function returns the RDF data as relational table rows, the remote RDF data can be combined with local relational data and/or processed in accordance with the database query that uses the SPARQL_SERVICE capability of the SQL TABLE function.
Definitions Some of the terms used in this description are defined below for easy reference. The presented terms and their respective definitions are not rigidly restricted to these definitions—a term may be further defined by the term's use within this disclosure.

The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances.

The articles "a" and "an" as used in this application and the appended claims should generally be construed to mean "one or more" unless specified otherwise or is clear from the context to be directed to a singular form.

Reference is now made in detail to certain embodiments. The disclosed embodiments are not intended to be limiting of the claims.

Descriptions of Exemplary Embodiments

Figure 1A:
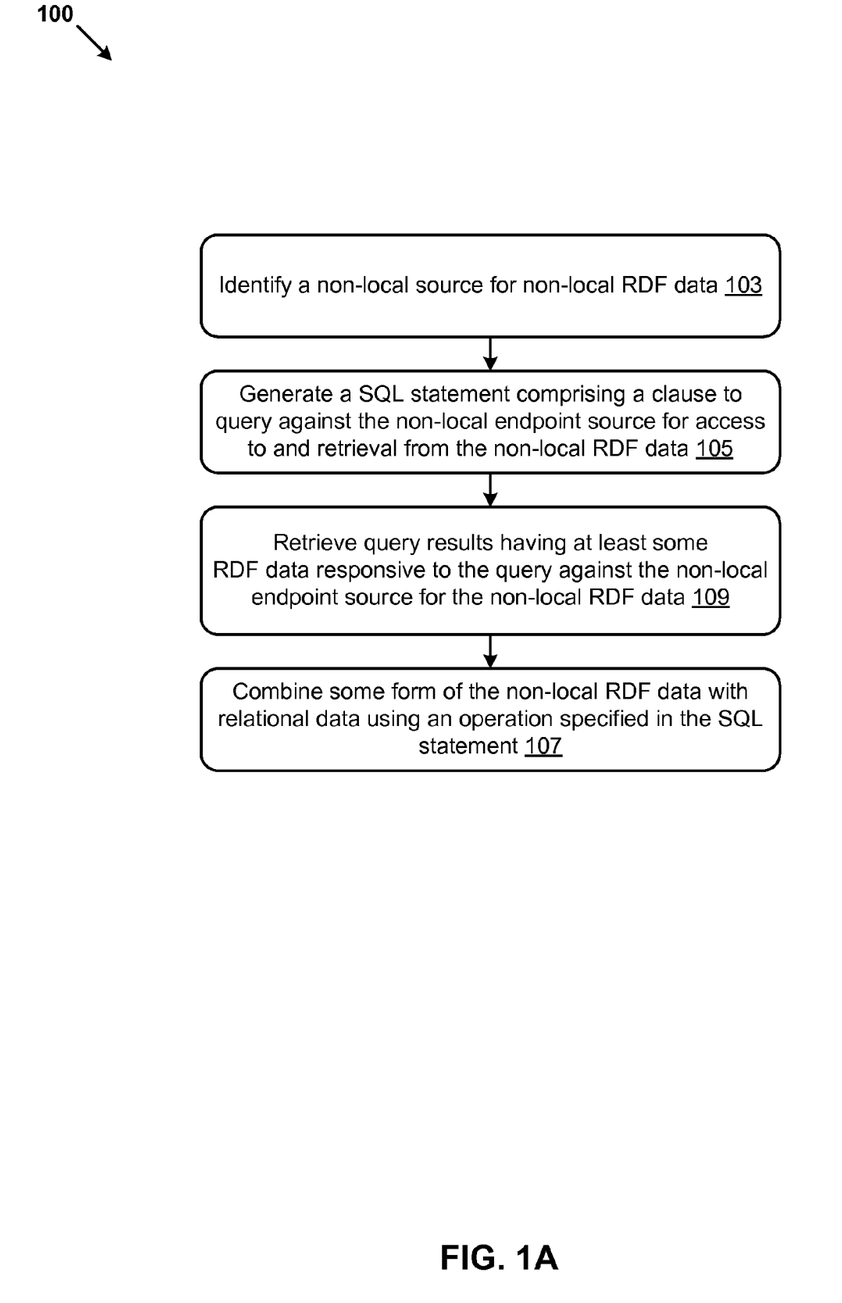
FIG. 1A depicts a processing flow for accessing a non-local endpoint from within an SQL query, according to some embodiments.

FIG. 1A depicts a processing flow 100 for accessing a non-local endpoint from within an SQL query, according to some embodiments. As shown, the flow commences by identifying a non-local source for RDF data (operation 103), then generates a SQL statement comprising a clause to query against the non-local endpoint source for access to and retrieval of the non-local RDF data (operation 105). The SQL statement is executed, with some portion of the SQL query (e.g., an embedded SPARQL query) being executed at the endpoint. The foregoing operations result in retrieval of query results having at least some RDF data (operation 109) which in turn can be combined with other data (e.g., relational data) during the performance of one or more operations specified in the SQL statement (operation 107). In exemplary cases, the non-local RDF data is retrieved from a SPARQL endpoint and combined with relational data.

Figure 1B:
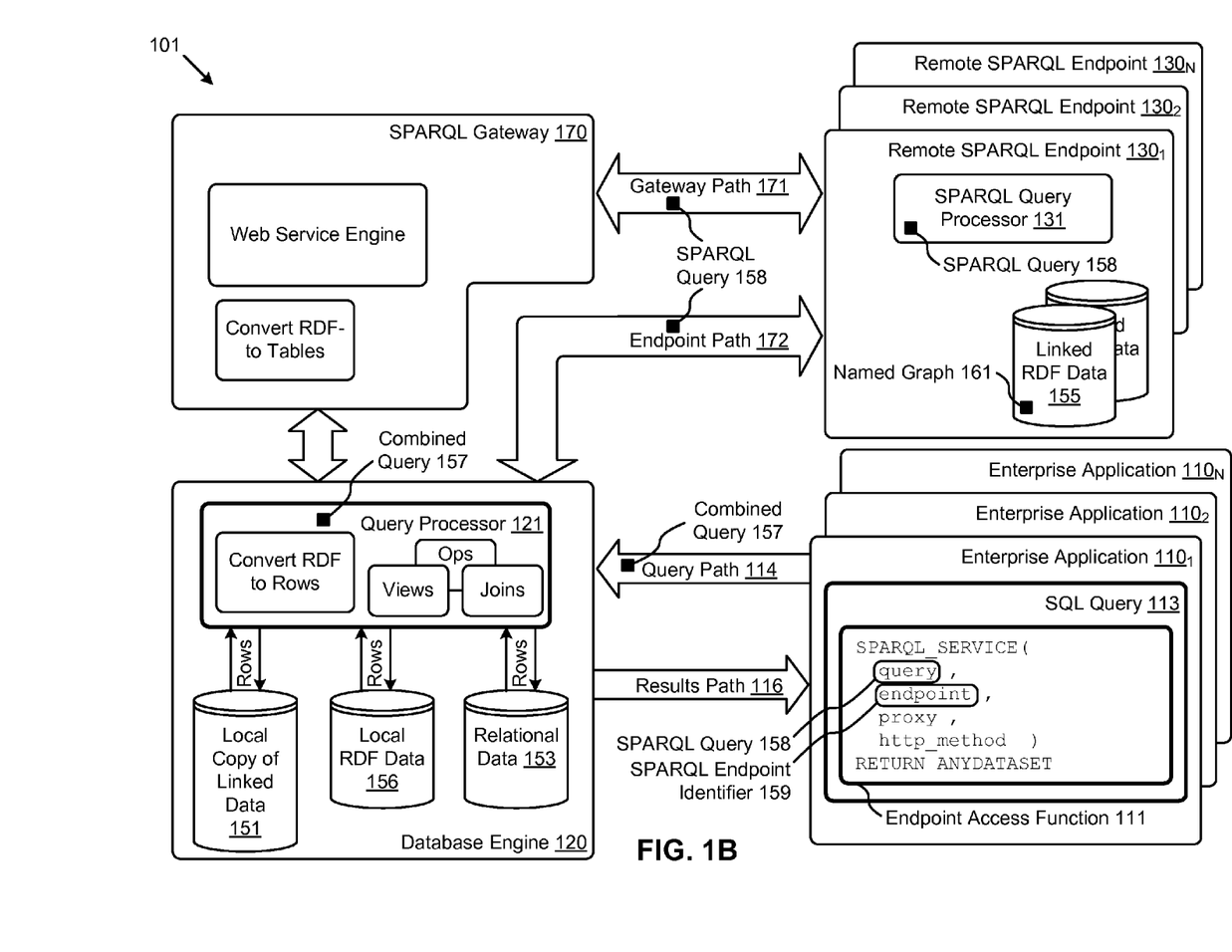
FIG. 1B depicts an environment for accessing a SPARQL endpoint from within an SQL query, according to some embodiments.

FIG. 1B depicts an environment 101 for accessing a SPARQL endpoint from within an SQL query. As an option, one or more instances of environment 101 or any aspect thereof may be implemented in the context of the architecture and functionality of the embodiments described herein. Also, the environment 101 or any aspect thereof may be implemented in any desired environment.

The environment 101 for accessing a SPARQL endpoint from within an SQL query provides a context in which RDF data is retrieved from a remote SPARQL endpoint 130 and converted into row-oriented data (e.g., linked data rows). The retrieved RDF data is brought into a common context so as to provide access for and/or integration with relational data 153. An SQL query can originate from an application (e.g., enterprise application $110_1$, enterprise application $110_2$, enterprise application $110_N$, a database application, etc.), and an enterprise application connects with a database engine 120 via a connection or other query path 114 configured to transport a query (e.g., SQL query 113). The result set from processing the query can be transported over results path 116. The results of the query are used by the application.

As shown, the enterprise application originates an SQL query 113. Such an SQL query 113 can be in the form of a combined query 157, which combined query 157 includes functions and/or relational database operations to integrate local relational data with data retrieved from a remote SPARQL endpoint 130. The shown endpoint access function 111 depicts usage of the SPARQL_SERVICE keyword. An SQL query 113 can be defined with or combined with SPARQL_SERVICE keywords, and a SPARQL query can be codified as shown in the example syntax. A possible syntax for a SPARQL_SERVICE statement and some exemplary uses are given below.

The extent or forms of queries used by or accessible to the application can be stored within the application, or the extent or forms of queries can be made accessible via pointers or references that can be employed by the application to retrieve a user query or other data, wherever located.

As shown, the query processor 121 can access rows of data (e.g., rows from relational data 153) and process relational database operations such as a join operation, a create table operation, a create view operation, and other relational database operations. Any repository of rows can be accessed and/or stored and/or combined by the query processor 121 when processing instances or portions of instances of a combined query 157. Exemplary constructions of the combined query 157 include operations to be performed over rows from relational data 153 in combination with rows from the local copy of linked data 151 and/or in combination with rows from previously-stored local RDF data 156.

Use of techniques for accessing external sources from within an SQL query and the presentation of the returned query results (e.g., that combine RDF data with relational data) provides a rich environment for a wide range of applications that rely on mixed forms of data storage. As earlier indicated, effective use of these techniques for accessing an external source from within an SQL query can greatly reduce the amount of data that needs to be stored locally in the database engine. Indeed, in some cases the size of the data stored at the external source can exceed petabytes, whereas the results of running a query remotely (e.g., at the external source) can in some cases result in only a small amount of the data being returned to the database engine.

One example of an external source is a SPARQL endpoint (e.g., remote SPARQL endpoint $130_1$, remote SPARQL endpoint $130_2$, remote SPARQL endpoint $130_N$, etc.). A SPARQL endpoint can be accessed by the database engine 120 with or without the use of a gateway (e.g., SPARQL gateway 170) and the results of running a SPARQL query at the SPARQL endpoint (e.g., over linked RDF data 155) can in some cases result in only a small amount of RDF data being returned to the database engine. In some cases, linked RDF data 155 can include one or more named graphs 161, and a SPARQL query can be performed over one or more named graphs.

Extending the query specification syntax and semantics as herein described offers techniques to convey SPARQL queries (e.g., as given by SPARQL query 158) to a SPARQL processing service at a SPARQL endpoint (e.g., as given by SPARQL endpoint identifier 159). The SPARQL processing service at a SPARQL endpoint returns results to the entity that requested them (e.g., to a SPARQL gateway 170 or to a database engine 120).

As shown, the SPARQL gateway 170 serves as a processing layer between a database engine 120 and SPARQL endpoints 130. The shown SPARQL gateway is a process that is entirely separate from the application processes, the database engine, and is separate from the SPARQL endpoints. The SPARQL gateway can pass a query (e.g., as given by SPARQL query 158) to a SPARQL endpoint (e.g., as given by the SPARQL endpoint identifier 159) over gateway path 171 and, in turn, a SPARQL endpoint provides results back to the gateway over gateway path 171. A SPARQL endpoint can comprise a SPARQL query processor 131, which can parse one or more queries such as any number of instances of SPARQL query 158.

In the embodiment of FIG. 1B, the specific technique used for conveying SPARQL queries to a SPARQL processing service is shown as endpoint path 172 and/or gateway path 171. Communications over endpoint path 172 and/or gateway path 171 can follow the protocol of HTTP and can be bidirectional, as shown. Furthermore, the content of communications over HTTP can be defined a priori, for example by a specification or recommendation of the W3C (e.g., see the depicted communication to/from SPARQL endpoints 130). Or, content of the communications over HTTP can be defined, for example by a database company (e.g., the maker of the database engine 120 or the maker of the SPARQL gateway 170).

Of course, the foregoing partitioning of operations and the described operations themselves are merely examples of accessing a SPARQL endpoint from within a SQL query. Additional features, protocols, and operations are possible, including parallelization of operations, some of which are described hereunder.

Figure 1C:
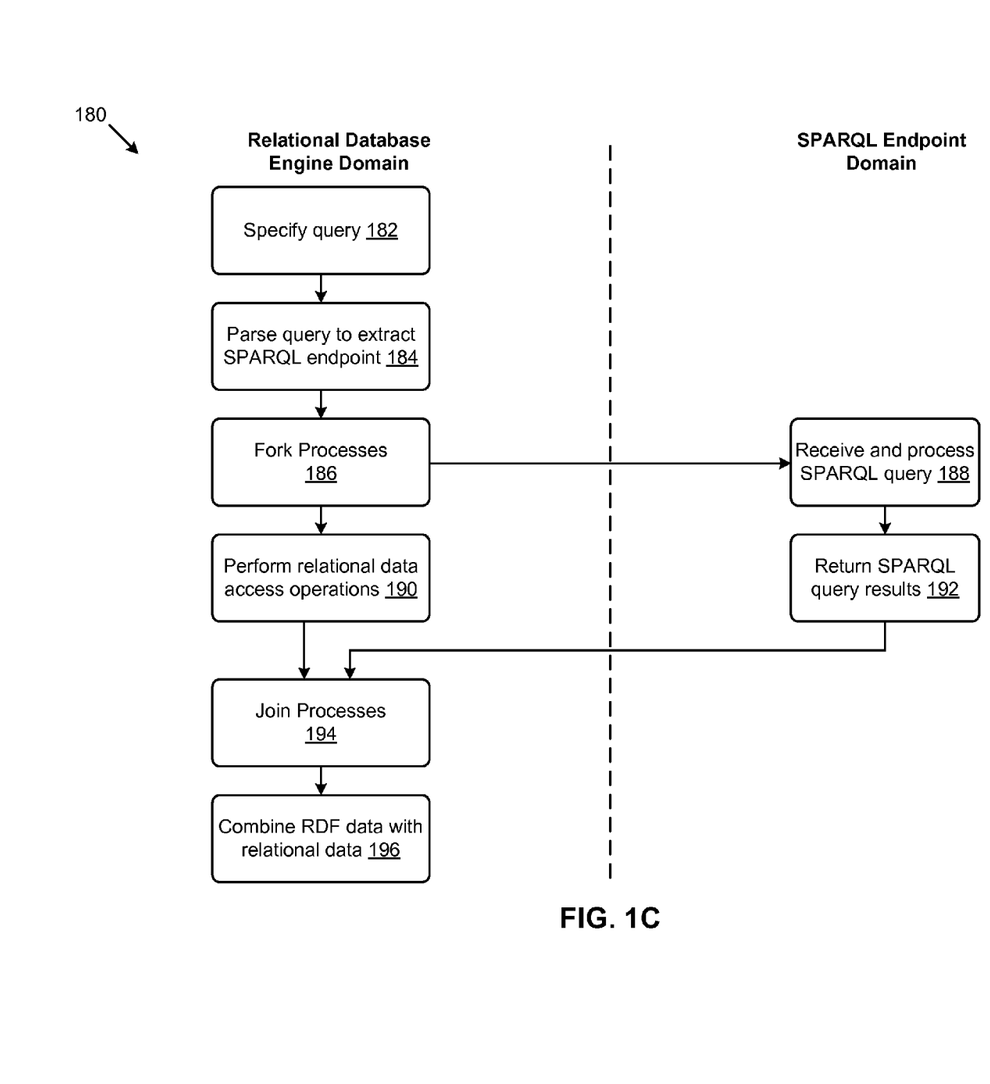
FIG. 1C depicts a processing flow for accessing a SPARQL endpoint from within an SQL query, according to some embodiments.

FIG. 1C depicts a processing flow 180 for accessing a SPARQL endpoint from within an SQL query, according to some embodiments. The processing flow 180 or any aspect thereof may be implemented in any desired environment.

Various operations within the shown processing flow are carried out in a relational database engine domain and in a SPARQL endpoint domain. The operations can be parallelized (e.g., see fork processes 186) and performed in the different domains. The results of performing the processes in the different domains can be brought together (e.g., see join processes 194).

The shown flow commences where a user or application specifies a query (see operation 182). The query (e.g., SQL query 113) is parsed (e.g., by database engine 120), and a location for a SPARQL endpoint is extracted (see operation 184). In this example, once the identifier of a SPARQL endpoint (e.g., a URI) is known, then parallelizable processes can be forked so as to allow processing of the SPARQL endpoint domain operations concurrently with any relational database engine domain operations.

For example, and as shown, the SPARQL endpoint domain operations might comprise receiving a SPARQL query (see operation 188), running the SPARQL query, and returning results of running the SPARQL query (see operation 192). The results of running the SPARQL query might return RDF data, which can be converted into row-oriented data. Concurrently, the relational database engine domain operations might include performing relational data access operations (see operation 190). A join processes step (see join processes 194) can resume sequential processing, for example, to combine RDF data with relational data (see operation 196).

Figure 1D:
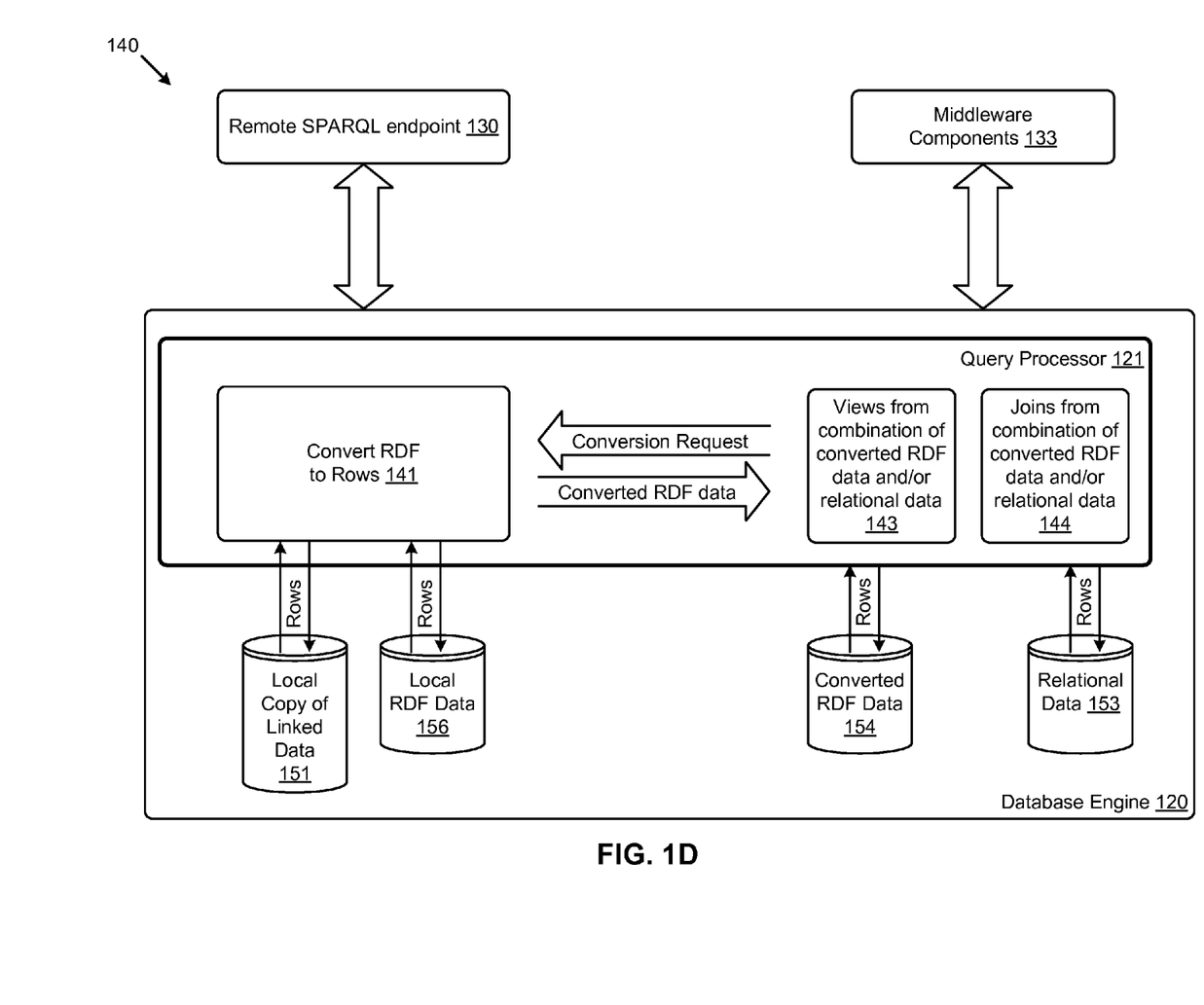
FIG. 1D depicts a processing flow for performing relational database operations when using data originating from a SPARQL endpoint in combination with relational data, according to some embodiments.

Many techniques for combining RDF data with relational data can be employed, for example, using the flow as presented in FIG. 1D.

FIG. 1D depicts a processing flow 140 for performing relational database operations when using data originating from a SPARQL endpoint in combination with relational data, according to some embodiments.

As shown, a remote SPARQL endpoint is accessed, and a conversion operation (see operation 141) is employed to convert RDF data in the form of triples into relational data in the form of rows (e.g., as a memory-resident collection of rows accessible by a query processor). The middleware component 133 may or may not be present and the flow does not rely on middleware processing of the RDF data. Instead, the database engine 120 processes RDF data received from the remote endpoint (e.g., using an operation or module to convert RDF to rows of relational data) and presents the converted data as converted RDF data 154.

The database engine employs a query processor 121, which query processor serves to perform relational database operations over data originating from a SPARQL endpoint in combination with relational data. For example, the query processor 121 can generate a view (see operation 143) using data originating from a SPARQL endpoint (e.g., converted RDF data 154) in combination with relational data (e.g., relational data 153). Or, for example, the query processor 121 can perform a join (see operation 144) using data originating from a remote SPARQL endpoint (e.g., using converted RDF data 154) in combination with relational data (e.g., relational data 153).

Using operational elements (e.g., as shown in the processing flow 140), a query processor can perform a wide range of relational database operations by combining row data formed from RDF data with one or more relational database tables.

Many further techniques for combining RDF data with relational data can be employed, for example, using the aforementioned SPARQL_SERVICE construction to convert RDF data into row-oriented data. Other techniques are presented in commonly-owned U.S. patent Ser. No. 13/114, 965, entitled "METHOD AND SYSTEM FOR PRESENTING RDF DATA AS A SET OF RELATIONAL VIEWS". The following FIG. 2 compares uses of locally-stored RDF data with a query syntax used for accessing a SPARQL endpoint to retrieve RDF data.

Figure 2:
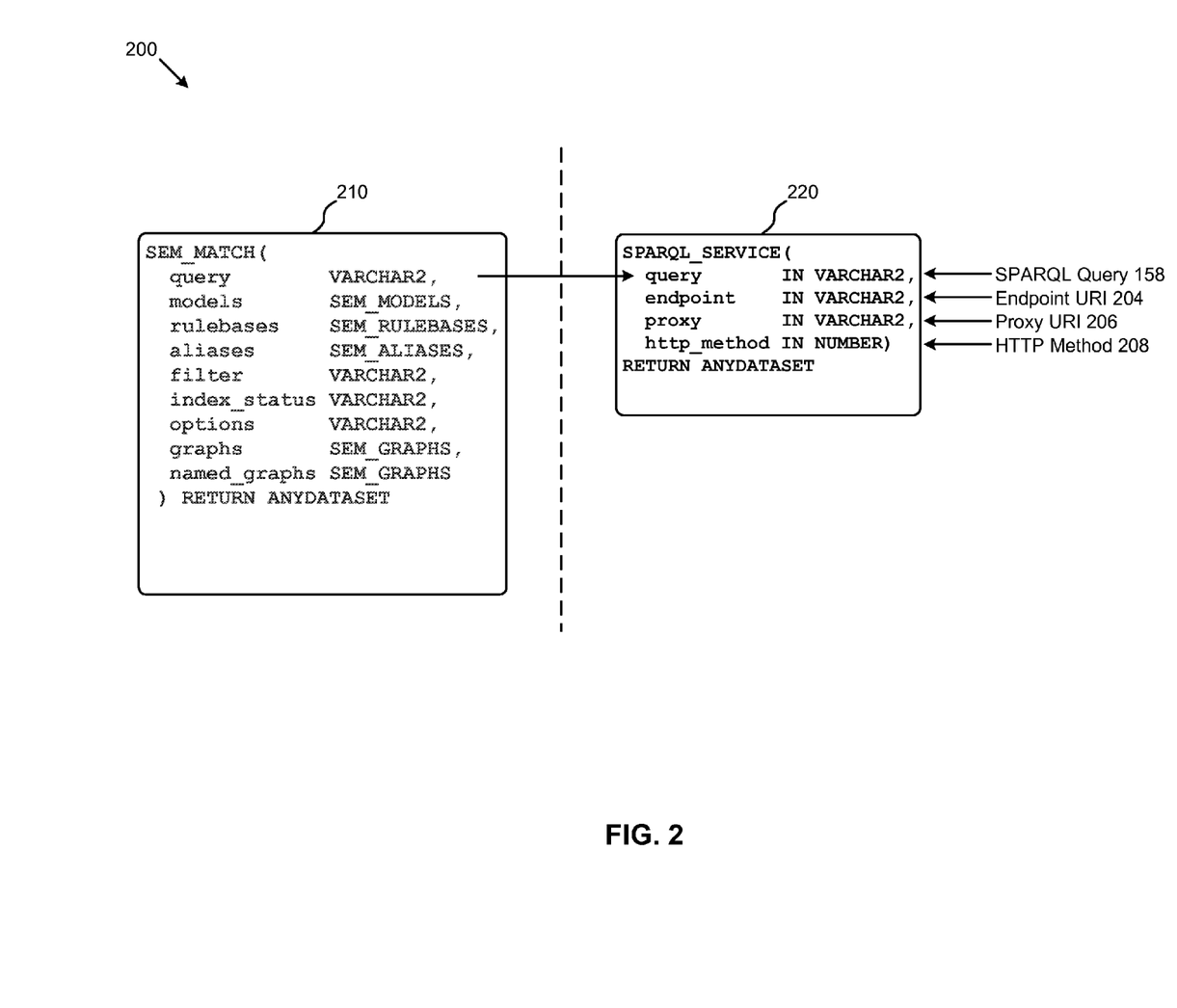
FIG. 2 presents a comparison chart to illustrate a query syntax used for accessing a SPARQL endpoint from within an SQL query, according to some embodiments.

FIG. 2 presents a comparison chart 200 to illustrate a query syntax used for accessing a SPARQL endpoint from within an SQL query. The comparison chart 200 or any aspect thereof may be implemented in any desired environment.

The shown SEM_MATCH construction 210 includes a SPARQL query in the VARCHAR2 variable query (see the left side of FIG. 2). The SPARQL_SERVICE construction (see the right side of FIG. 2) also includes a SPARQL query in the VARCHAR2 variable query (e.g., see SPARQL query 158), however the SPARQL_SERVICE construction 220 also includes an endpoint variable (e.g., see endpoint URI 204), a proxy variable (e.g., see proxy URI 206), and an $http_{13}$ method variable (e.g., see http method 208).

An operation synopsis of the SPARQL_SERVICE construction is as follows:

The SPARQL_SERVICE construction accepts a SPARQL query string and a SPARQL endpoint URI as input.

Query processing sends the SPARQL query to the endpoint URI (e.g., via HTTP), possibly through a gateway.

Query processing or an agent receives results from the SPARQL endpoint (e.g., in a SPARQL result XML format).

Results from the SPARQL endpoint are parsed and formatted as rows of a table.

In some cases, each SPARQL query variable found in the SPARQL query string is used to form a column, and each found value for the variable is a cell in that column.

Using the above SPARQL_SERVICE construction in combination with facilities within the database engine, relational database rows can be formed from SPARQL query results. For example, each SPARQL query variable may be mapped to a relational column (e.g., for a database table/ view/rowsource). Strictly as an example, each found value corresponding to a SPARQL query variable may be mapped to a relational data value. In the following scenario, a set of relational data comprising records of students and relationships is formed in order to generate a list of a student's "friends of friends" (e.g., friend of a friend, or FOAF, or foaf). In that case, it might be convenient to have a column named "Student". Further, it might be convenient to specify a SPARQL query variable of the same name, "Student".

For illustration of this scenario, consider the SPARQL query pattern: {?x rdf:type <urn:Student>. ?x foaf:name ?n}. This query pattern is based on two statements. The first pattern statement, "?x rdf:type <urn:Student>", is used to match all "Student" resources in the RDF data. The second pattern statement "x foaf:name ?n", is used to retrieve the names of the found students. The two statements are "joined" through the variable ?x, which appears in both statements. A result of this query could return the value <urn:student1> for variable "?x" and the value "John" for variable "?n". As can be seen, substituting the found values for "?x" and for "?n" gives the RDF triples {student1 rdf:type <urn:Student>. student1 foaf:name "John"}.

A query can be decomposed into constituent operations, and in most cases, operations can be parallelized. One possible syntax to express parallelization in a SQL query is to use an SQL construction such as

"PARALLEL ENABLE".

As earlier indicated, a SQL query in the form of an embodiment of the present disclosure can use the SPARQL_SERVICE keyword. Usage synopsis of the SPARQL_SERVICE keyword and construction is as follows:

The query parameter is a string that describes the graph pattern corresponding to the SPARQL query that is invoked against the specified SPARQL endpoint.

The location (e.g., URL) of such SPARQL endpoint is specified in the endpoint parameter.

The proxy parameter can be specified (or can be "null"), and a specified proxy (e.g., a SPARQL proxy) can be employed for communications with the endpoint.

The http_method parameter indicates by which of the methods from the SPARQL 1.1 protocol the query should be sent (e.g., HTTP Get or HTTP Post).

As indicated above, the SPARQL_SERVICE construction makes a W3C standards-compliant remote SPARQL endpoint appear as a row source to the database engine, which in turn can be used in SQL joins and table and/or view creation.

Figure 3:
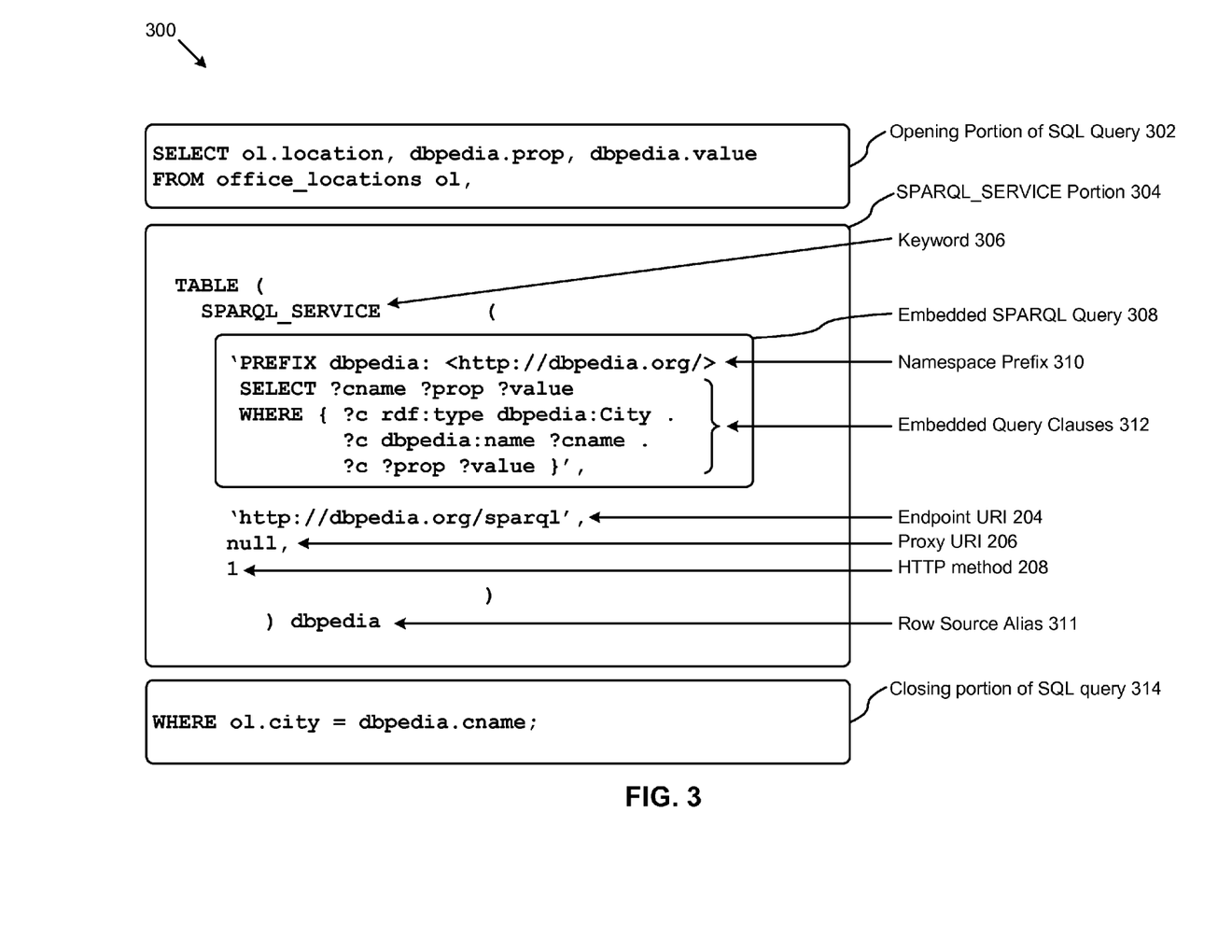
FIG. 3 depicts a sample SQL query to illustrate query usage when accessing a SPARQL endpoint from within an SQL query, according to some embodiments.

FIG. 3 depicts a sample SQL query 300 to illustrate query usage when accessing a SPARQL endpoint from within an SQL query. As an option, one or more instances of SQL query 300 or any aspect thereof may be implemented in the context of the architecture and functionality of the embodiments described herein. Also, the SQL query 300 or any aspect thereof may be implemented in any desired environment.

Strictly as an example, the SQL query 300 combines an embedded SPARQL query into a SQL query using the SPARQL_SERVICE construction. The syntax and function are further described in the paragraphs below.

Strictly as an illustration of the syntax, the shown sample SQL query 300 embeds a SPARQL query within the SPARQL_SERVICE construction. The sample includes an opening portion of an SQL query 302, a SPARQL_SERVICE portion 304, and a closing portion of the SQL query 314. The SPARQL_SERVICE portion 304 comprises a keyword 306 to indicate the SPARQL service semantics. In this case the keyword "SPARQL_SERVICE" is used, although any keyword can be used in the syntax to convey the same or similar semantics.

To illustrate the function of this sample SQL query 300, suppose an HR manager is trying to plan activities for new hires at her company. She would like to find more information about the cities in which her company has offices. Further consider the scenario where her company's HR database stores street addresses and city names for office locations, but does not contain information about local activities and attractions that would be useful for planning group activities for new hires. She would like to link her HR database with other data sources such as Wikipedia to find information about local activities and attractions in those cities where her company has offices.

To link her HR database with Wikipedia, or more specifically, "DBPedia", a SQL query using SPARQL_SERVICE might be defined as is shown in FIG. 3. The query in FIG. 3 queries the DBPedia SPARQL endpoint (which comprises an RDF version of Wikipedia data) to retrieve information from Wikipedia about cities that are listed as office locations in her company's HR database.

The SPARQL_SERVICE portion 304 comprises an embedded SPARQL query 308, which in turn can include a namespace prefix 310 (e.g., "dbpedia: <http://dbpedia.org/>"). The namespace prefix 310 serves to specify the name of a 'namespace' that is in turn used to uniquely identify named items (e.g., elements and attributes) in an RDF graph. Also, the SPARQL_SERVICE portion 304 comprises an embedded SPARQL query 308, and any number of embedded query clauses 312 (e.g., native database language SELECT clauses and/or WHERE clauses). Continuing, the SPARQL_SERVICE portion 304 comprises specification of an endpoint URI 204, which may include an access protocol (e.g., http://dbpedia.org/sparql). In some cases the SPARQL_SERVICE portion 304 can comprise a proxy URI 206 (or a null value), and an HTTP access method indication (e.g., the '1' in the position of the http_method parameter corresponds to the http GET option).

The query in FIG. 3 joins against two row sources: (1) the local office_locations table and (2) the row source returned via the SPARQL_SERVICE invocation, which is aliased as dbpedia (see row source alias 311). The SPARQL_SERVICE invocation queries the SPARQL endpoint located at http://www.dbpedia.org/sparql and uses three triple patterns. The first pattern, "?c rdf:type dbpedia:City", retrieves all cities in the DBPedia RDF data. The second pattern, "?c dbpedia:name ?cname", retrieves the name of each found city and stores this information into the variable "?cname". The third pattern, "?c ?prop ?value", retrieves all RDF triples about each city and stores the predicate property of the triple into "?prop" and the object of the triple into variable "?value". For example, this invocation of SPARQL_SERVICE may return "New York" dbpedia:containsPark "Central Park".

The closing portion of the SQL query 314 is a WHERE clause that joins the local HR database with the SPARQL_SERVICE results based on an equality of each returned value in variable "?cname" (from the SPARQL_SERVICE result) as compared with each value in "ol.city" that comes from the local HR database table "ol". In this example as given, the portion of the SQL query 302 serves to project rows from the join of office_locations and the returned results from the SPARQL_SERVICE invocation. More specifically, the portion of the SQL query 302 serves to project occurrences in office_location from the HR database onto the found results in prop and value from the SPARQL_SERVICE invocation.

The example of FIG. 3 can be extended. As shown below, a SPARQL query can be performed over a collection of RDF graphs (e.g., an RDF dataset). An RDF graph is formed by a set of triples. If the RDF graph is given a name in the form of an internationalized resource identifier (an IRI) it is called a named graph.

Strictly as one example, a SPARQL query can include named graphs. Again referring to the example of FIG. 3, suppose an HR manager is trying to plan activities for new hires at her company. The SQL example of FIG. 3 can be modified as shown below to use named graphs, e.g., by adding the new "FROM" clauses to the example code that correspond to the named graphs, "museums", and "restaurants". In such a scenario, the combined query 157 can be codified in the form as shown below:

```
SELECT ol.company, dbpedia.prop, dbpedia.value
FROM office_locations ol,
    TABLE (
        SPARQL_SERVICE (
            'PREFIX dbpedia: <http://dbpedia.org/>
            SELECT ?cname ?prop ?value
            FROM <http://dbpedia.org/museums>
            FROM <http://dbpedia.org/restaurants>
            WHERE {        ?c rdf:type dbpedia: City .
                           ?c dbpedia:name ?cname .
                           ?c ?prop ?value }',
            'http://dbpedia.org/sparql',
            null,
            1          )
        ) dbpedia
WHERE ol.city = dbpedia.cname;
```

The above example code extends the scenario of FIG. 3 to use the named graphs "museums" and "restaurants" from which to draw RDF data since the HR manager in this sample scenario is particularly interested in museums and restaurants for new hires to visit. To specify this, the extended example uses the FROM clause to specify that the pattern should match against the union of the museums graph and the restaurants graph.

The above example includes two WHERE clauses. The first is a SPARQL WHERE clause and the second is a SQL WHERE clause. The SPARQL WHERE clause encodes graph patterns for matching RDF data, and the SQL WHERE clause specifies a join condition between the HR relational table and the row data created after retrieving the DBPedia RDF data. The join condition ("=") in the SQL WHERE clause serves to link or combine the converted remote RDF data from DBPedia with local relational HR data where the office location and city is the same as the found value from the named graphs and/or from other DBPedia data.

Figure 4:
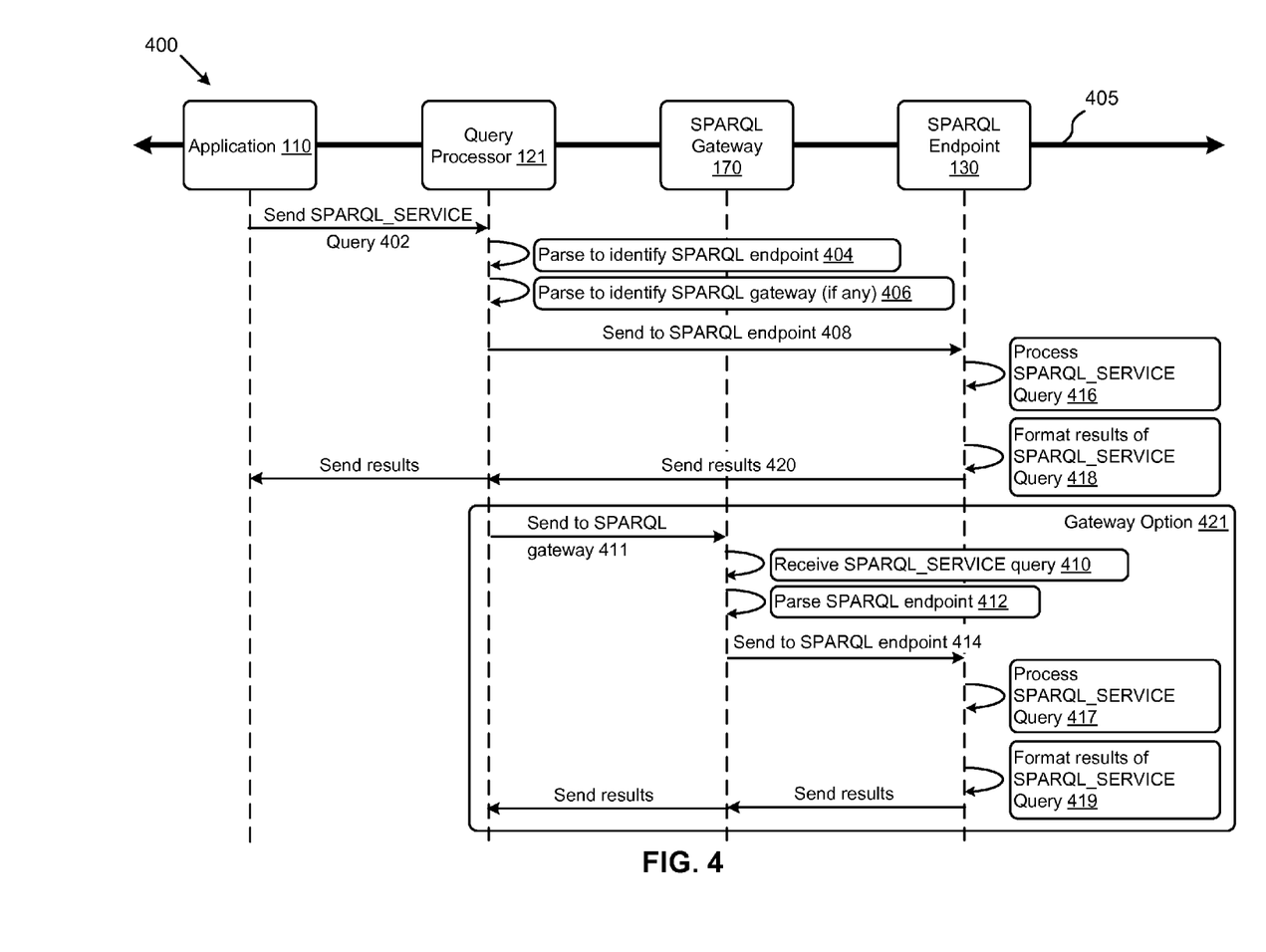
FIG. 4 is a diagram showing a protocol for accessing a SPARQL endpoint from within an SQL query, according to some embodiments.

FIG. 4 is a diagram showing a protocol 400 for accessing a SPARQL endpoint from within an SQL query. As an option, one or more instances of protocol 400 or any aspect thereof may be implemented in the context of the architecture and functionality of the embodiments described herein. Also, the protocol 400 or any aspect thereof may be implemented in any desired environment.

The discussion of FIG. 4 includes an operation synopsis of the SPARQL_SERVICE construction. The operations can be performed by any computational unit, and a protocol can be established (e.g., in the case of a proprietary protocol) or a protocol can be used (e.g., in the case of a W3C protocol). Such a protocol can be performed between computational units communicating over path 405. The shown protocol proceeds as follows:

An application 110 forms a query including the SPARQL_SERVICE construction and sends the query 402 to a query processor 121.

The query processor accepts the sent query string and parses the sent query to identify the SPARQL endpoint URI (see operation 404) and identify a gateway URI (see operation 406), if a gateway is used.

The query processor 121 sends the SPARQL query to the remote SPARQL endpoint 130 (e.g., see message 408).

At the specified endpoint (e.g., remote SPARQL endpoint 130), the query is processed (see operation 416). Such processing might include formatting the results of the SPARQL query (see operation 418).

The results are sent to the requestor (e.g., see message 420), such as a query processor 121.

The query processor in turn combines the results from the SPARQL endpoint and integrates those SPARQL results with local relational data.

These combined results are passed to the requestor (e.g., application 110).

In some embodiments a gateway is used (e.g., using the gateway option 421):

The query processor sends the query encapsulated in the SPARQL_SERVICE construction to the SPARQL gateway (e.g., see message 411).

The SPARQL gateway receives the query (see operation 410) and parses the query to identify a SPARQL endpoint (see operation 412) to which endpoint the query is sent (see message 414).

At the specified endpoint (e.g., remote SPARQL endpoint 130) the query is processed (see operation 417). Such processing might include formatting the results of the SPARQL query (see operation 419) before sending to the gateway.

The SPARQL gateway 170 receives results from the SPARQL endpoint (e.g., in a SPARQL result XML format) and passes the results (possibly after processing) to the query processor 121.

The query processor in turn combines the results from the SPARQL endpoint and integrates those SPARQL results with local relational data.

These combined results are passed to the requestor (e.g., application 110).

Additional Embodiments of the Disclosure

Additional Practical Application Examples

Figure 5:
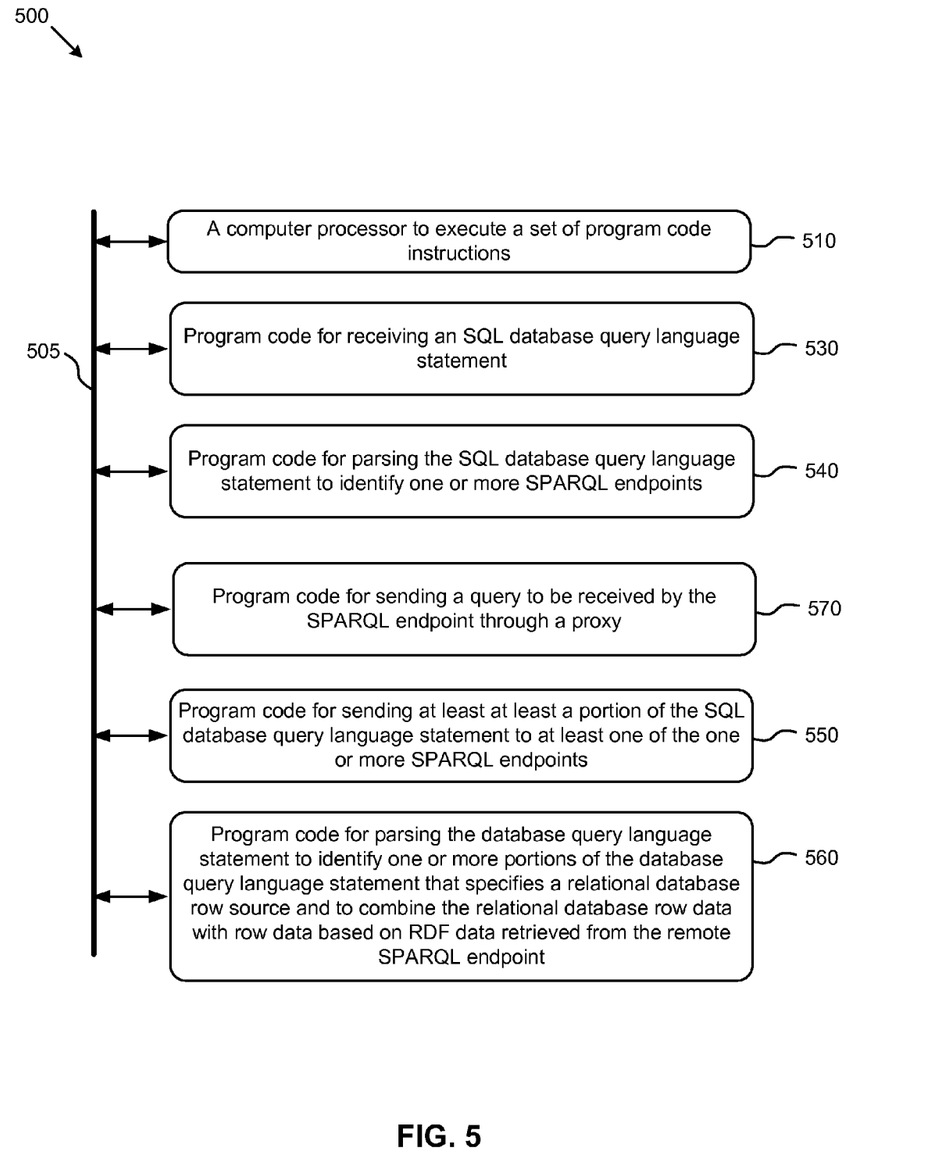
FIG. 5 is a block diagram of a system for accessing a SPARQL endpoint from within an SQL query, according to some embodiments.

FIG. 5 is a block diagram of a system for accessing a SPARQL endpoint from within an SQL query, according to some embodiments. As an option, the present system 500 may be implemented in the context of the architecture and functionality of the embodiments described herein. Of course, however, the system 500 or any operation therein may be carried out in any desired environment.

As shown, system 500 comprises at least one processor and at least one memory, the memory serving to store program instructions corresponding to the operations of the system. As shown, an operation can be implemented in whole or in part using program instructions accessible by a module. The modules are connected to a communication path 505, and any operation can communicate with other operations over communication path 505. The modules of the system can, individually or in combination, perform method operations within system 500. Any operations performed within system 500 may be performed in any order unless as may be specified in the claims.

The embodiment of FIG. 5 implements a portion of a computer system, shown as system 500, comprising a computer processor to execute a set of program code instructions (see module 510) and modules for accessing memory to hold program code instructions to perform: receiving an SQL database query language statement (see module 530); parsing the SQL database query language statement to identify one or more SPARQL endpoints (see module 540); and sending at least a portion of the SQL database query language statement to at least one of the one or more SPARQL endpoints (see module 550).

Some embodiments may comprise additional operations, which operations can be performed in any felicitous order. Such additional operations include: parsing the database query language statement to identify one or more portions of the database query language statement that specifies a relational database table and combining the relational database table with row data based on RDF data retrieved from the remote SPARQL endpoint (see module 560) and/or sending the query to be received by the SPARQL endpoint through a proxy (see operation 570).

System Architecture Overview
Additional System Architecture Examples

Figure 6:
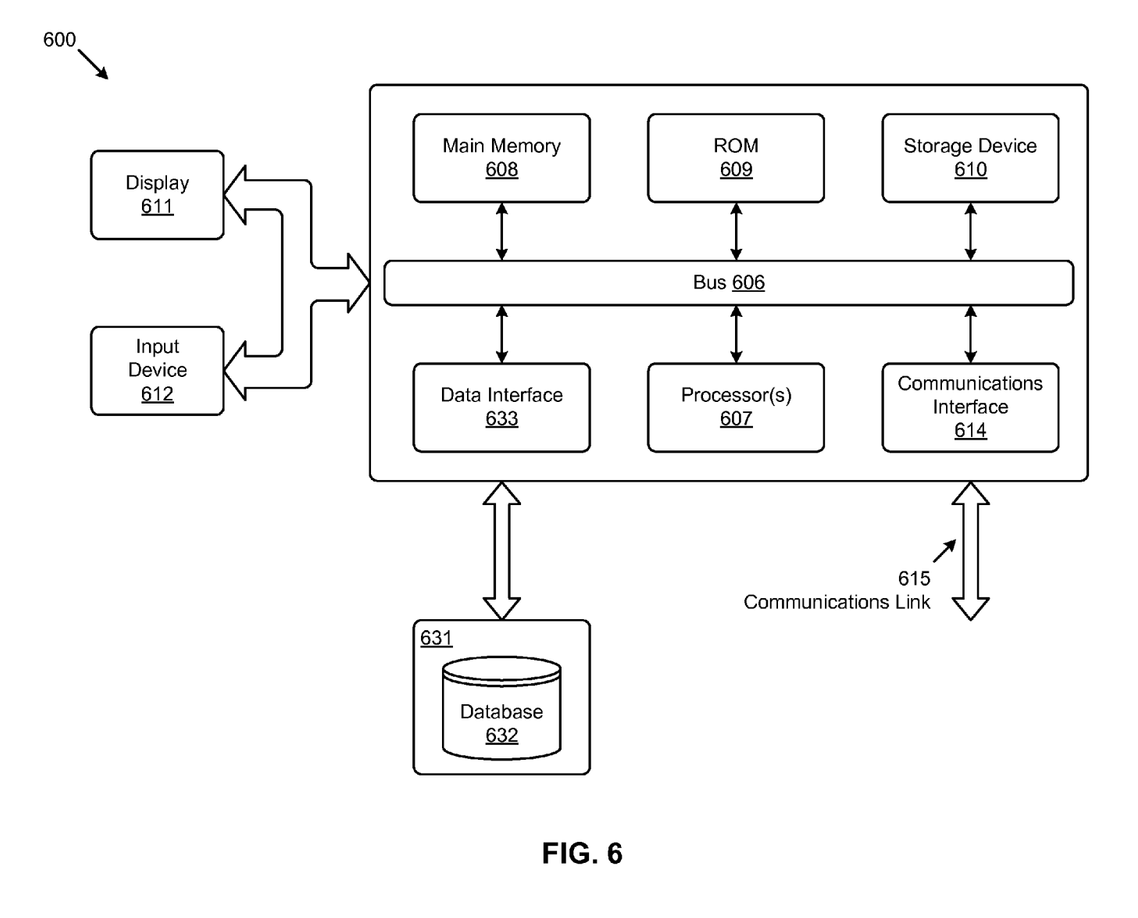
FIG. 6 depicts a block diagram of an instance of a computer system suitable for implementing an embodiment of the present disclosure.

FIG. 6 depicts a block diagram of an instance of a computer system 600 suitable for implementing an embodiment of the present disclosure. Computer system 600 includes a bus 606 or other communication mechanism for communicating information, which interconnects subsystems and devices, such as a processor 607, a system memory 608 (e.g., RAM), a static storage device (e.g., ROM 609), a disk drive 610 (e.g., magnetic or optical), a data interface 633, a communication interface 614 (e.g., modem or Ethernet card), a display 611 (e.g., CRT or LCD), input devices 612 (e.g., keyboard, cursor control), and an external data repository 631.

According to one embodiment of the disclosure, computer system 600 performs specific operations by processor 607 executing one or more sequences of one or more instructions contained in system memory 608. Such instructions may be read into system memory 608 from another computer readable/usable medium, such as a static storage device or a disk drive 610. In alternative embodiments, hard-wired circuitry may be used in place of or in combination with software instructions to implement the disclosure. Thus, embodiments of the disclosure are not limited to any specific combination of hardware circuitry and/or software. In one embodiment, the term "logic" shall mean any combination of software or hardware that is used to implement all or part of the disclosure.

The term "computer readable medium" or "computer usable medium" as used herein refers to any medium that participates in providing instructions to processor 607 for execution. Such a medium may take many forms, including but not limited to, non-volatile media and volatile media. Non-volatile media includes, for example, optical or magnetic disks, such as disk drive 610. Volatile media includes dynamic memory, such as system memory 608.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory medium from which a computer can read data.

In an embodiment of the disclosure, execution of the sequences of instructions to practice the disclosure is performed by a single instance of the computer system 600. According to certain embodiments of the disclosure, two or more computer systems 600 coupled by a communications link 615 (e.g., LAN, PTSN, or wireless network) may perform the sequence of instructions required to practice the disclosure in coordination with one another.

Computer system 600 may transmit and receive messages, data, and instructions, including programs (e.g., application code), through communications link 615 and communication interface 614. Received program code may be executed by processor 607 as it is received, and/or stored in disk drive 610 or other non-volatile storage for later execution. Computer system 600 may communicate through a data interface 633 to a database 632 on an external data repository 631. A module as used herein can be implemented using any mix of any portions of the system memory 608, and any extent of hard-wired circuitry including hard-wired circuitry embodied as a processor 607.

In the foregoing specification, the disclosure has been described with reference to specific embodiments thereof. It will, however, be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are, accordingly, to be regarded in an illustrative sense rather than in a restrictive sense.

What is claimed is:

1. A method comprising:
using a computing system having at least one processor to perform a process, the process comprising:
receiving a SQL database query language statement on a SQL database, wherein
the SQL database query language statement comprises one or more SQL query clauses and a table function that transforms at least one SPARQL endpoint into a row source for the SQL database to integrate local relational data with non-local RDF data retrieved from the one or more SPARQL endpoints, and
a SPARQL query string and at least one SPARQL endpoint of one or more SPARQL endpoints are embedded in the table function of SQL database query language statement;
executing the SQL database query language statement including the table function on the SQL database to transform the at least one SPARQL endpoint into a row source for the SQL database, wherein during execution of the SQL database query language statement on the SQL database,
executing the one or more SQL query clauses on the SQL database;
sending at least the SPARQL query string embedded in the SQL database query language statement to the at least one SPARQL endpoint that is embedded in the SQL database query language statement, wherein the at least one SPARQL endpoint is identified by parsing at least the table function in the SQL database query language statement that has been executed;
receiving query results from the at least one SPARQL endpoint, at least a portion of the query results corresponding to the non-local RDF data;
converting the non-local RDF data into a relational data format to generate converted RDF data; and
combining the converted RDF data with relational data from a local relational database.

2. The method of claim 1, wherein combining the converted RDF data with the relational data is performed without requiring pre-access or pre-stage RDF data from the one or more remote SPARQL endpoints.

3. The method of claim 1, wherein the SQL database query language statement including the table function is executed to transform the at least one SPARQL endpoint into the row source for the SQL database without using a gateway between the SQL database and the at least one SPARQL endpoint.

4. The method of claim 3, wherein a database engine of the SQL database converts the non-local RDF data into the relation data format and executes the one or more SQL query language strings.

5. The method of claim 1, wherein at least one of the remote SPARQL endpoints corresponds to a SPARQL endpoint URL.

6. The method of claim 1, wherein at least a portion of the SQL database query language statement comprises an HTTP request method.

7. The method of claim 1, further comprising performing a relational database operation by combining rows formed from RDF data with at least one relational database table.

8. The method of claim 1, further comprising parsing the SQL database query language statement to identify a proxy.

9. The method of claim 8, wherein the proxy is a SPARQL gateway.

10. The method of claim 9, further comprising receiving at least some RDF data from the SPARQL gateway.

11. A computer program product embodied in a non-transitory computer readable medium, the computer readable medium having stored thereon a sequence of instructions which, when executed by a processor causes the processor to execute a set of acts, the set of acts comprising:
receiving a SQL database query language statement on a SQL database, wherein
the SQL database query language statement comprises one or more SQL query clauses and a table function that transforms at least one SPARQL endpoint into a row source for the SQL database to integrate local relational data with non-local RDF data retrieved from the one or more SPARQL endpoints, and
a SPARQL query string and at least one SPARQL endpoint of one or more SPARQL endpoints are embedded in the table function of SQL database query language statement;
executing the SQL database query language statement including the table function on the SQL database to transform the at least one SPARQL endpoint into a row source for the SQL database, wherein
during execution of the SQL database query language statement on the SQL database,
executing the one or more SQL query clauses on the SQL database;
sending at least the SPARQL query string embedded in the SQL database query language statement to the at least one SPARQL endpoint that is embedded in the SQL database query language statement, wherein the at least one SPARQL endpoint is identified by parsing at least the table function in the SQL database query language statement that has been executed;
receiving query results from the at least one SPARQL endpoint, at least a portion of the query results corresponding to the non-local RDF data;
converting the non-local RDF data into a relational data format to generate converted RDF data; and
combining the converted RDF data with relational data from a local relational database.

12. The computer program product of claim 11, further comprising instructions which, when executed by the processor, further cause the processor to execute the set of acts, and the set of acts further comprising receiving at least some RDF data from the one or more remote SPARQL endpoints.

13. The computer program product of claim 12, wherein the SQL database query language statement comprises an operation to be performed over at least some of the RDF data.

14. The computer program product of claim 13, wherein at least some of the RDF data comprises at least a portion of a named RDF graph.

15. The computer program product of claim 11, wherein at least one of the remote SPARQL endpoints corresponds to a SPARQL endpoint URL.

16. The computer program product of claim 11, wherein at least a portion of the SQL database query language statement comprises an HTTP request method.

17. The computer program product of claim 11, further comprising instructions which, when executed by the processor, further cause the processor to execute the set of acts, and the set of acts further comprising performing a relational database operation by combining rows formed from RDF data with at least one relational database table.

18. The computer program product of claim 11, further comprising instructions which, when executed by the processor, further cause the processor to execute the set of acts, and the set of acts further comprising parsing the SQL database query language statement to identify a proxy.

19. A computer system comprising:
a query processor to receive a SQL database query language statement on a SQL database, wherein
the SQL database query language statement comprises one or more SQL query clauses and a table function that transforms at least one SPARQL endpoint into a row source for the SQL database to integrate local relational data with non-local RDF data retrieved from the one or more SPARQL endpoints, and
a SPARQL query string and at least one SPARQL endpoint of one or more SPARQL endpoints are embedded in the table function of SQL database query language statement;
an SQL database engine that executes the SQL database query language statement including the table function on the SQL database to transform the at least one SPARQL endpoint into a row source for the SQL database, wherein
during execution of the SQL database query language statement on the SQL database,
the SQL database engine is further configured to execute the one or more SQL query language strings on the SQL database, to send at least the SPARQL query string embedded in the SQL database query language statement to the at least one SPARQL endpoint that is embedded in the SQL database query language statement, wherein the at least one SPARQL endpoint is identified by parsing at least the table function in the SQL database query language statement that has been executed, to receive query results from the at least one SPARQL endpoint, at least a portion of the query results corresponding to the non-local RDF data, to convert the non-local RDF data into a relational data format to generate converted RDF data, and to combine the converted RDF data with relational data from a local relational database.

20. The computer system of claim 19, wherein the database engine receives at least some RDF data from the one or more SPARQL endpoints.

* * * * *

UNITED STATES PATENT AND TRADEMARK OFFICE
CERTIFICATE OF CORRECTION

PATENT NO. : 9,836,503 B2
APPLICATION NO. : 14/159702
DATED : December 5, 2017
INVENTOR(S) : Perry et al.

Page 1 of 1

It is certified that error appears in the above-identified patent and that said Letters Patent is hereby corrected as shown below:

On the Title Page

On page 2, Column 1, under Other Publications, Line 6, delete "Exwcutable" and insert -- Executable --, therefor.

On page 2, Column 1, under Other Publications, Line 15, delete "Jounal" and insert -- Journal --, therefor.

On page 2, Column 1, under Other Publications, Line 15, delete "Semenatics," and insert -- Semantics, --, therefor.

On page 2, Column 2, under Other Publications, Line 23, delete "Databse"," and insert -- Database", --, therefor.

In the Specification

In Column 8, Line 39, delete "$http_{13}$" and insert -- http_ --, therefor.

Signed and Sealed this
Tenth Day of July, 2018

Andrei Iancu
*Director of the United States Patent and Trademark Office*